(12) United States Patent
Choe

(10) Patent No.: US 11,963,484 B2
(45) Date of Patent: Apr. 23, 2024

(54) COVERING SOIL MULCHING APPARATUS HAVING SOIL CLOGGING PREVENTION FUNCTION

(71) Applicant: GREEN AND SEED CORPORATION, Jeollabuk-do (KR)

(72) Inventor: Sung-jin Choe, Jeollabuk-do (KR)

(73) Assignee: GREEN AND SEED CORPORATION, Jeollabuk-Do (KR)

( * ) Notice: Subject to any disclaimer, the term of this patent is extended or adjusted under 35 U.S.C. 154(b) by 703 days.

(21) Appl. No.: 17/268,159

(22) PCT Filed: Jul. 21, 2020

(86) PCT No.: PCT/KR2020/009572
§ 371 (c)(1),
(2) Date: Feb. 12, 2021

(87) PCT Pub. No.: WO2022/014763
PCT Pub. Date: Jan. 20, 2022

(65) Prior Publication Data
US 2022/0183239 A1   Jun. 16, 2022

(30) Foreign Application Priority Data
Jul. 17, 2020   (KR) .................. 10-2020-0088696

(51) Int. Cl.
*A01G 13/02*   (2006.01)
*A01B 33/02*   (2006.01)
*A01B 33/16*   (2006.01)

(52) U.S. Cl.
CPC .......... *A01G 13/0287* (2013.01); *A01B 33/02* (2013.01); *A01B 33/16* (2013.01)

(58) Field of Classification Search
CPC ...... A01G 13/0287; A01B 33/02; A01B 33/16
See application file for complete search history.

(56) References Cited

FOREIGN PATENT DOCUMENTS

| FR | 2675006 A1 * | 10/1992 | ............. A01B 33/02 |
|---|---|---|---|
| KR | 10-1227810 B1 | 1/2013 | |
| KR | 10-1254462 B1 | 4/2013 | |
| KR | 10-1442965 B1 | 9/2014 | |
| KR | 10-1651388 B1 | 8/2016 | |
| KR | 10-2095964 B1 | 5/2020 | |

* cited by examiner

*Primary Examiner* — Tara Mayo
(74) *Attorney, Agent, or Firm* — The PL Law Group, PLLC

(57) ABSTRACT

A covering soil mulching apparatus according to an embodiment includes a soil scattering part at the rear end of the agricultural machine and including a scattering part frame and a scattering unit provided on a lower end side of the scattering part frame and scattering soil on a floor, a mulching film laying part including a laying part frame connected to a rear end side of the soil scattering part and a mulching film holding part having a mulching film wound around the mulching film holding part and spreading the mulching film on the floor, an oscillating plate above the mulching film holding part and guiding the scattered soil to be transported to a rear side and laid on an upper surface of the mulching film, and a soil oscillating part including oscillator for oscillating the oscillating plate to prevent formation of a soil wall on the oscillating plate.

7 Claims, 9 Drawing Sheets

COVERING SOIL MULCHING APPARATUS HAVING SOIL CLOGGING PREVENTION FUNCTION

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2020/009572, filed on Jul. 21, 2020, which claims priority to the benefit of Korean Patent Application No. 10-2020-0088696 filed in the Korean Intellectual Property Office on Jul. 17, 2020, the entire contents of which are incorporated herein by reference.

BACKGROUND

Technical Field

The present disclosure relates to a covering soil mulching apparatus having a function of preventing clogging of soil, and more particularly, to a mulching apparatus which allows soil containing moisture and even having highly viscous soil quality to cover the entire surface of a film without clogging so that the film is brought into close contact with the ground.

Background Art

In general, seedling and transplanting farming methods enable a constant and relatively high yield compared to direct sowing in which seeds are directly sown on the farmland and are thus applied to many kinds of farming, including rice farming. In particular, 90% or more of rice farming adopts the seedling and transplanting methods.

However, seedling and transplanting works require a lot of labor, making it increasingly difficult in the reality of rural areas with an aging population, and the need for direct sowing that does not require seedling and transplanting rapidly increases. In addition, a mulching film has become an indispensable agricultural material for farmers who want to increase the production of high quality agricultural products by providing weeding, warming, and moisturizing functions.

In the light of the reality of rural areas where the labor problem is currently intensified, under the idea that considerable labor can be saved if the seedling and transplanting stages can be replaced by direct sowing and a mulching film can be laid at the same time, the use of a seed film (mulching film with seed) in which seeds are attached to a mulching film gradually increases, and the need for equipment to lay the seed film also increases.

Prior Art Patent Registration No. 10-1254462 describes "a seed film laying apparatus installed at the rear end of an agricultural machine such as a riding type laying apparatus, a rice transplanter, a tractor, a cultivator, or a managing machine, the seed film laying apparatus including: a frame provided at the rear end of the agricultural machine; a seed film holding part which has a seed film wound therearound and is installed on the upper end side of the frame; a leveling plate which is provided on the lower end side of the frame, has a longitudinal direction parallel to a planar direction of the paddy field, and levels the paddy field on which the seed film is to be laid; a seed film pressing part which is spaced apart from the leveling plate at a specific interval, is provided on the rear side of the leveling plate, and presses the seed film spread on the paddy field by rotation of the seed film holding part; and a wheel-shaped seed film fixing part which is spaced apart from the seed film pressing part at a specific interval, is provided on the rear side of the seed film pressing part, and presses and fixes both ends of the pressed seed film, in which the leveling plate has a concavely curved toward the rear side, and further including an adjuster for rotating the leveling plate about a longitudinal axis of the leveling plate, a sensor which detects the height and strength of the paddy field, and a controller which controls the adjuster based on data detected by the sensor."

Prior Art Patent Registration No. 10-1227810 describes "an improved seed film-only laying apparatus which is a seed film laying apparatus including a frame provided at the rear end of an agricultural machine such as a riding type laying apparatus, a rice transplanter, a tractor, a cultivator, or a managing machine, a seed film holding part which has a biodegradable seed film wound therearound and is installed on the upper end side of the frame, a leveling plate which is provided on the lower end side of the frame, has a longitudinal direction parallel to a planar direction of the farmland ground, and levels the farmland ground on which the seed film is to be laid, a seed film pressing part which is spaced apart from the leveling plate at a specific interval, is provided on the rear side of the leveling plate, and presses the seed film spread on the farmland ground by rotation of the seed film holding part, and a wheel-shaped seed film fixing part which is spaced apart from the seed film pressing part at a specific interval, is provided on the rear side of the seed film pressing part, and presses and fixes both ends of the pressed seed film, and further including: a connection frame which integrally connects the frame to the rear end of the rice transplanter; and a side fertilizing machine which applies a fertilizer to the farmland ground at a position spaced apart from seeds inside the seed film spread on the farmland ground by a predetermined distance to help growing and rooting of the seeds."

Prior Art Patent Registration No. 10-1442965 describes "a seed film laying apparatus installed at the rear end of an agricultural machine such as a riding type covering machine, a rice transplanter, a tractor, a cultivator, or a managing machine, the seed film laying apparatus including: a frame provided at the rear end of the agricultural machine; a seed film holding part which has a seed film wound therearound and is installed on the upper end side of the frame; a leveling plate which is provided on the lower end side of the frame, has a longitudinal direction parallel to a planar direction of the paddy field, and levels the paddy field on which the seed film is to be laid; a seed film pressing part which is spaced apart from the leveling plate at a specific interval, is provided on the rear side of the leveling plate, and presses the seed film spread on the paddy field by rotation of the seed film holding part; a wheel-shaped seed film fixing part which is spaced apart from the seed film pressing part at a specific interval, is provided on the rear side of the seed film pressing part, and presses and fixes both ends of the pressed seed film; a cutting part which is provided between the seed film fixing part and the seed film pressing part and cuts the seed film; forceps which are provided between the cutting part and the seed film pressing part and pick up the seed film immediately before and immediately after a direction change drive of the agricultural machine in a case where a direction change of the agricultural machine is required; and a guide member which is provided on both sides of the front end of the agricultural machine and presses the paddy field on which the seed film is to be installed to display a position at which the seed film is laid on the paddy field, in which the leveling plate has a concavely curved toward the rear side, and further including an adjuster for rotating the leveling plate about a longitudinal axis of the leveling plate, a sensor which detects the height and strength of the paddy field, and a controller which controls the adjuster based on data detected by the sensor."

As can be seen in the prior art, a mulching film is easily peeled off by the wind due to its characteristics and thus needs to be covered with soil during mulching to fix the film to the ground. However, since manual works require a lot of labor, there have been many attempts to cover soil by utilizing the power of the tractor and an agricultural rotary as a soil scattering part. FIG. 1 illustrates a side configuration view of a covering soil mulching apparatus having a soil scattering part in the related art.

Since the position of a cultivator blade of an agricultural rotary that scatters soil is structurally located below a roll-type mulching film, the mulching film may be damaged by the scattering soil. Therefore, a mulching film protective cover has to be provided to protect the mulching film. Accordingly, the scattering soil can pass the mulching film protective cover while drawing a parabola and reach the top of the mulching film.

FIGS. 2 to 5 illustrate schematic views showing a problem phenomenon in which a soil wall is formed in the case of the covering soil mulching apparatus having only the soil scattering part in the related art.

As illustrated in FIGS. 2 to 5, since a large amount of the scattering soil falls and accumulates on the mulching film protective cover to form a wall, there is a problem that a soil wall that no longer allows the parabola of the scattering soil to pass the mulching film protective cover is formed.

SUMMARY

Therefore, the present disclosure has been conceived to solve the problems in the related art as described above, and an object according to an embodiment of the present disclosure is to provide a film laying apparatus for a tractor, which has a cam function of periodically and strongly shaking off soil accumulated on a mulching film protective cover in order to prevent soil scattered by a cultivator rotary blade from being accumulated on the mulching film protective cover and blocking a scattering path, such that the soil scattered by the cultivator rotary blade reaches the top of the mulching film while drawing a parabola without clogging, and an operation method of the apparatus.

On the other hand, technical problems to be solved in the present disclosure are not limited to the technical problems mentioned above, and other technical problems that are not mentioned can be clearly understood by those of ordinary skill in the technical field to which the present disclosure belongs from the following description.

The object of the present disclosure can be achieved as a covering soil mulching apparatus having a function of preventing clogging of soil, in which the covering soil mulching apparatus is installed at a rear end of an agricultural machine such as a riding type covering machine, a rice transplanter, a tractor, a cultivator, or a managing machine, the covering soil mulching apparatus including: a soil scattering part that is provided at the rear end of the agricultural machine and includes a scattering part frame and a scattering unit which is provided on a lower end side of the scattering part frame and scatters soil on a floor; a mulching film laying part that includes a laying part frame connected to a rear end side of the soil scattering part, and a mulching film holding part which has a mulching film wound therearound and spreads the mulching film on the floor; an oscillating plate that is located above the mulching film holding part and guides the soil scattered by the soil scattering part to be transported to a rear side and laid on an upper surface of the mulching film; and a soil oscillating part that includes an oscillator for oscillating the oscillating plate to prevent formation of a soil wall on the oscillating plate.

In addition, at least one supply pipe for supplying at least one of water, a seed, a fertilizer, a pesticide, and a drop hose to a lower portion of the mulching film may be further included.

In addition, the scattering unit may include a scattering blade which scatters soil, a gearbox having a first driving part, and a first power transmission member which transmits a driving force of the first driving part to the scattering blade.

In addition, the oscillator may include an oscillating shaft rotated by an oscillating power transmission part, and a cam member installed on the oscillating shaft, a lower end surface of the oscillating plate may come in contact with an outer surface of the cam member, and the oscillating plate may be oscillated according to a shape of the outer surface of the cam member by rotation of the cam member.

In addition, the oscillator may further include a roller hinged to a bracket joined to the lower end surface of the oscillating plate, the outer surface of the cam member may be rotated in contact with an outer surface of the roller, and the oscillator may further include a reciprocating motion guide joined to the laying part frame, and a reciprocating motion shaft which is joined to one upper end side of the oscillating plate and guides a reciprocating motion of the oscillating plate by the reciprocating motion guide.

In addition, the oscillating power transmission part may include a driving shaft which is driven to rotate by a second driving part, and a second power transmission member which transmits a power of the driving shaft to the oscillating shaft.

According to the film laying apparatus for a tractor, which has a cam function, and the operation method of the apparatus according to the embodiment of the present disclosure, an effect of periodically and strongly shaking off soil accumulated on a mulching film protective cover in order to prevent soil scattered by a cultivator rotary blade from being accumulated on the mulching film protective cover and blocking a scattering path, such that the soil scattered by the cultivator rotary blade reaches the top of the mulching film while drawing a parabola without clogging is achieved.

On the other hand, the effects that can be obtained in the present disclosure are not limited to the effects mentioned above, and other effects that are not mentioned can be clearly understood by those of ordinary skill in the technical field to which the present disclosure belongs from the following description.

BRIEF DESCRIPTION OF THE DRAWINGS

The following drawings attached to the present specification illustrate preferred embodiments of the present disclosure, and serve to further understand the technical idea of the present disclosure together with the detailed description of the present disclosure, so the present disclosure should not be construed as limited to the matters described in such drawings.

DETAILED DESCRIPTION

Hereinafter, the configuration, function, and operation method of a covering soil mulching apparatus having a function of preventing clogging of soil according to an embodiment of the present disclosure will be described.

Figure 1:
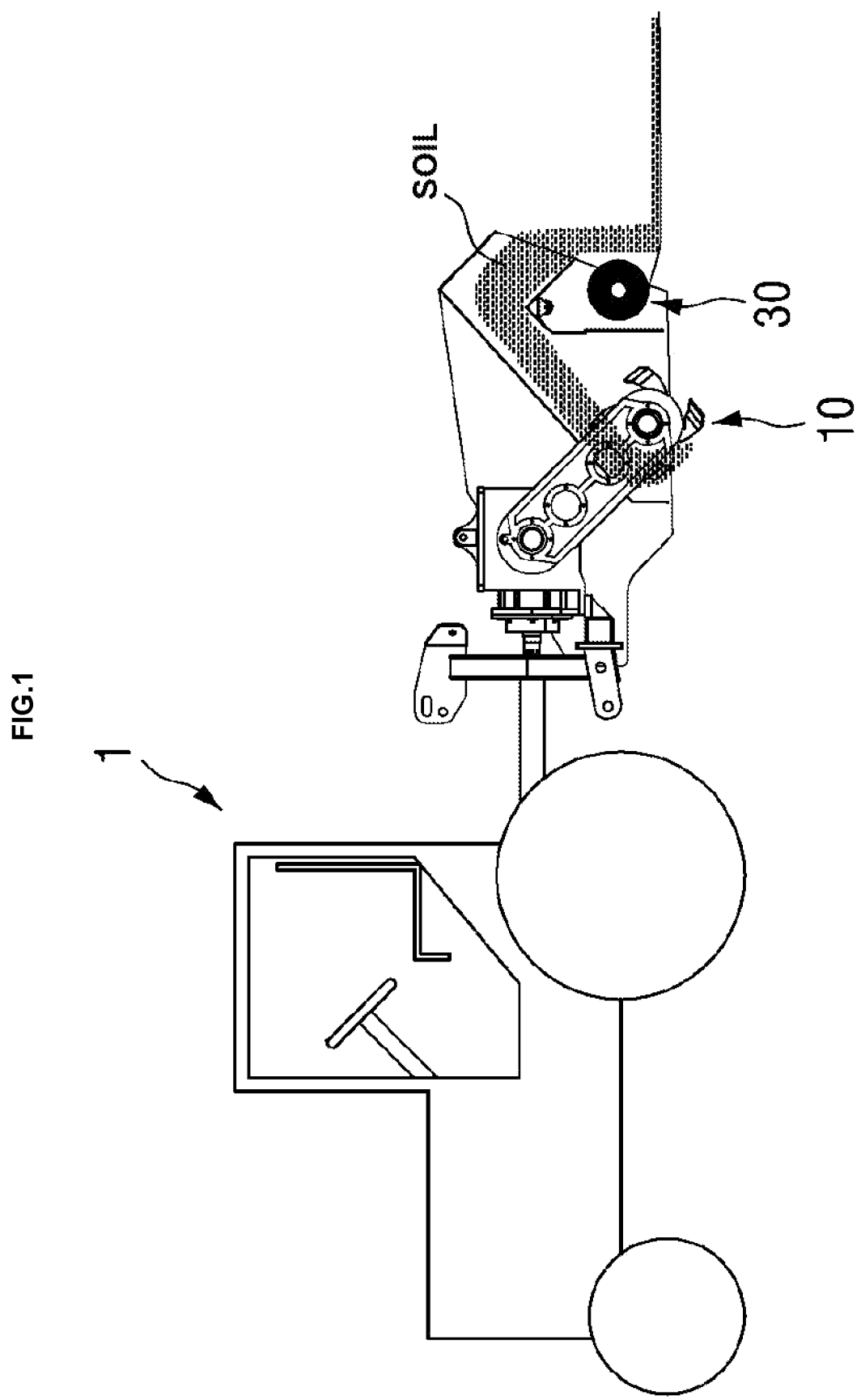
FIG. 1 is a side configuration view of a covering soil mulching apparatus having a soil scattering part in the related art.
Figure 2:
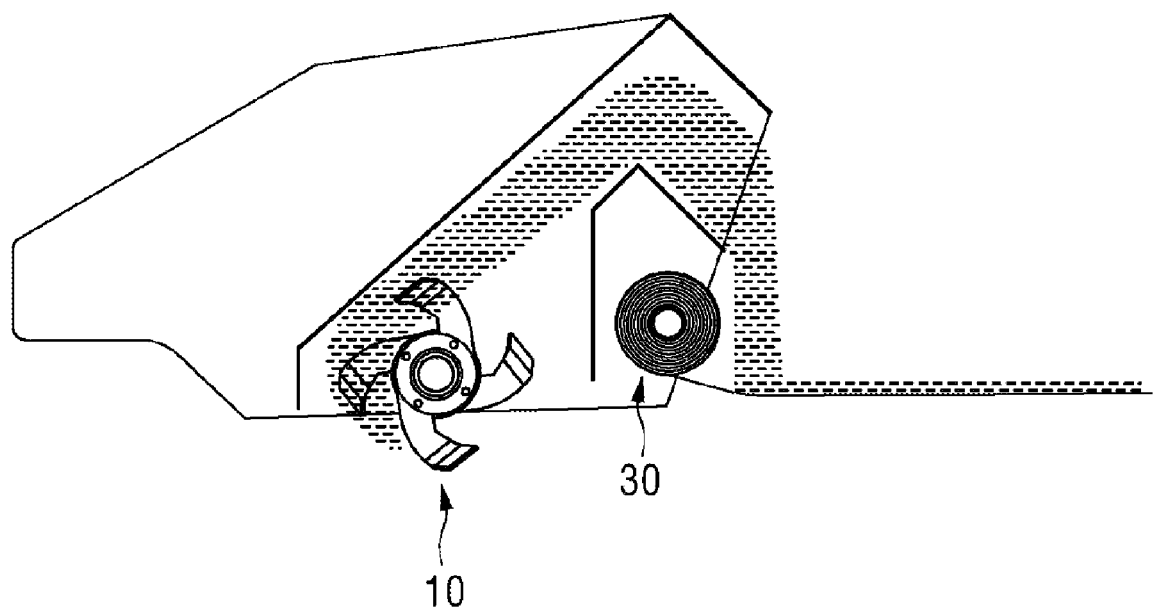
FIGS. 2 to 5 are schematic views showing a problem phenomenon in which a soil wall is formed in the case of the covering soil mulching apparatus having only the soil scattering part in the related art.
Figure 3:
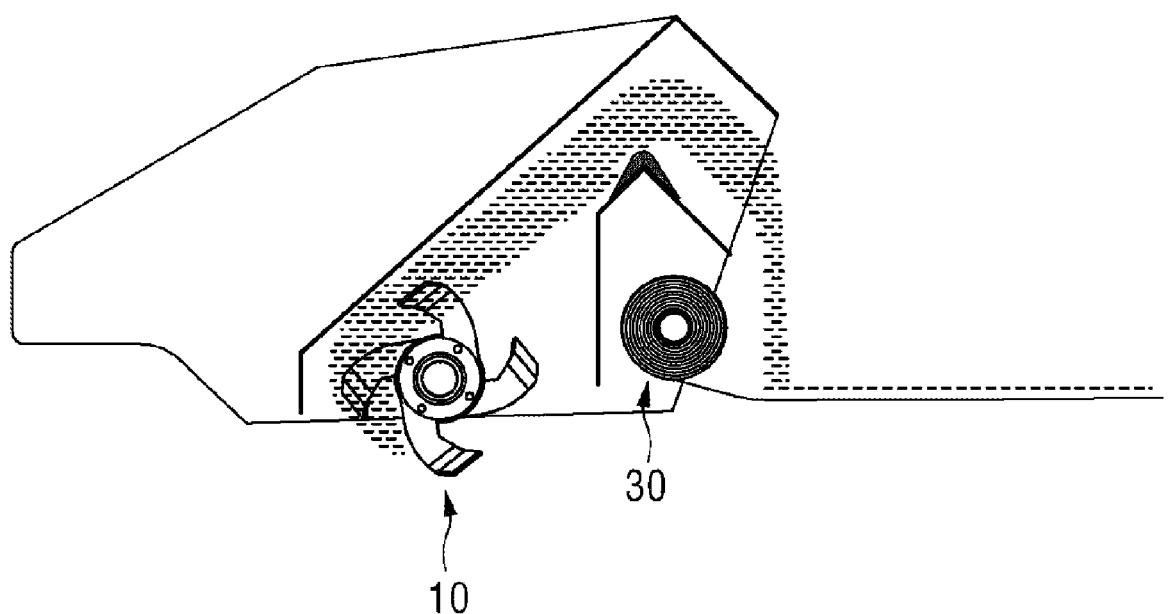
Figure 4:
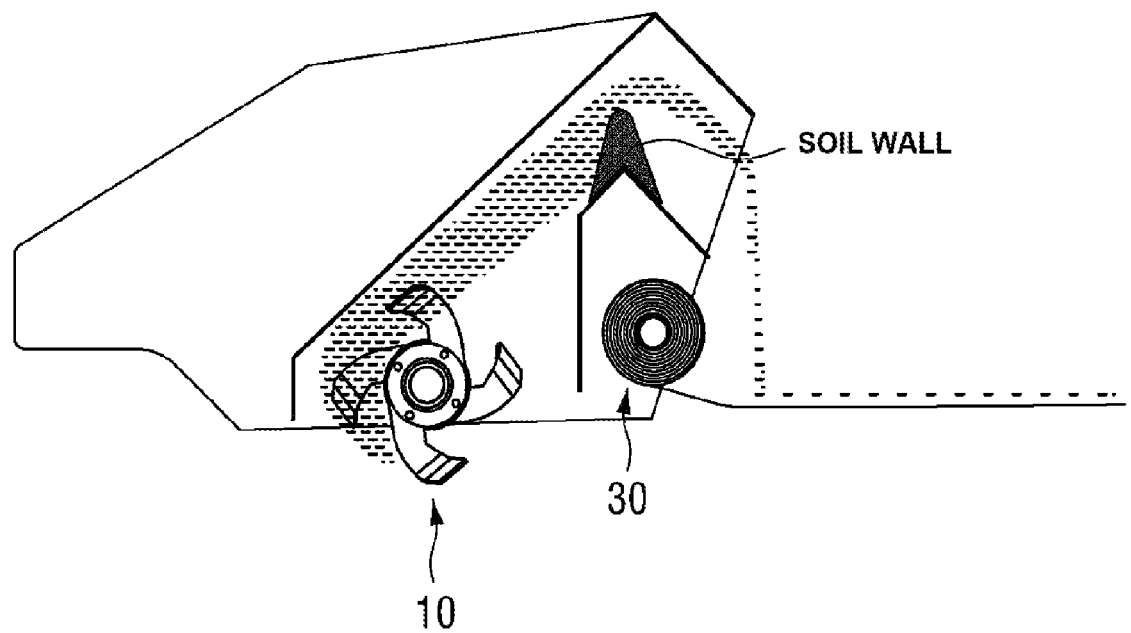
Figure 5:
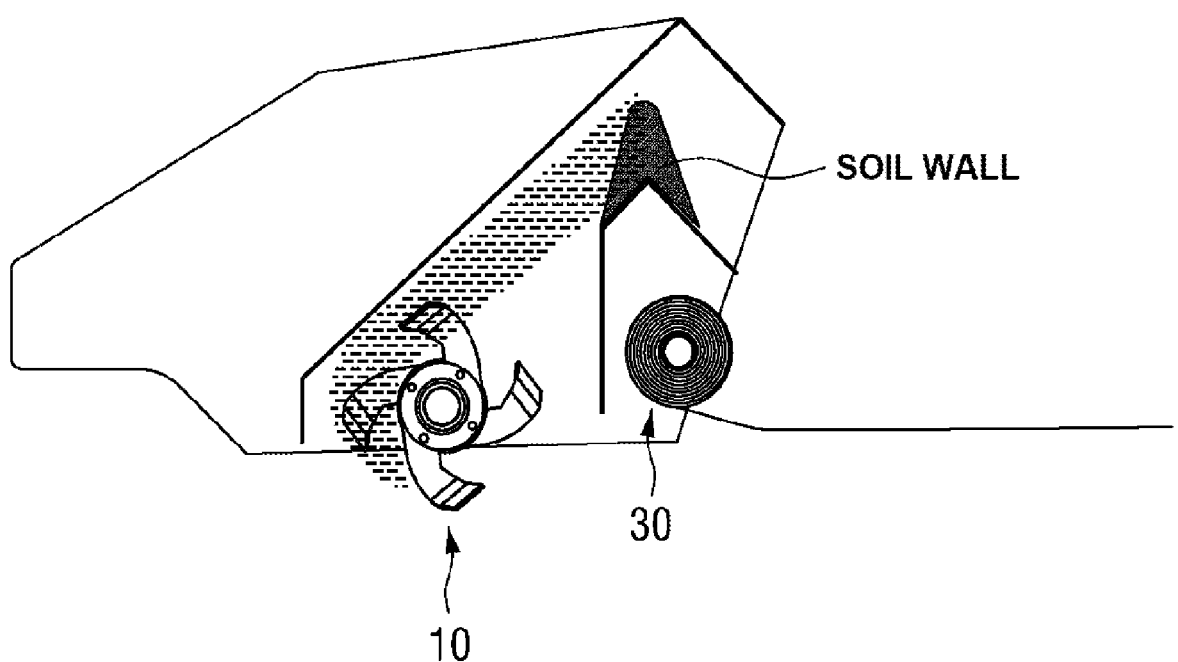
Figure 6:
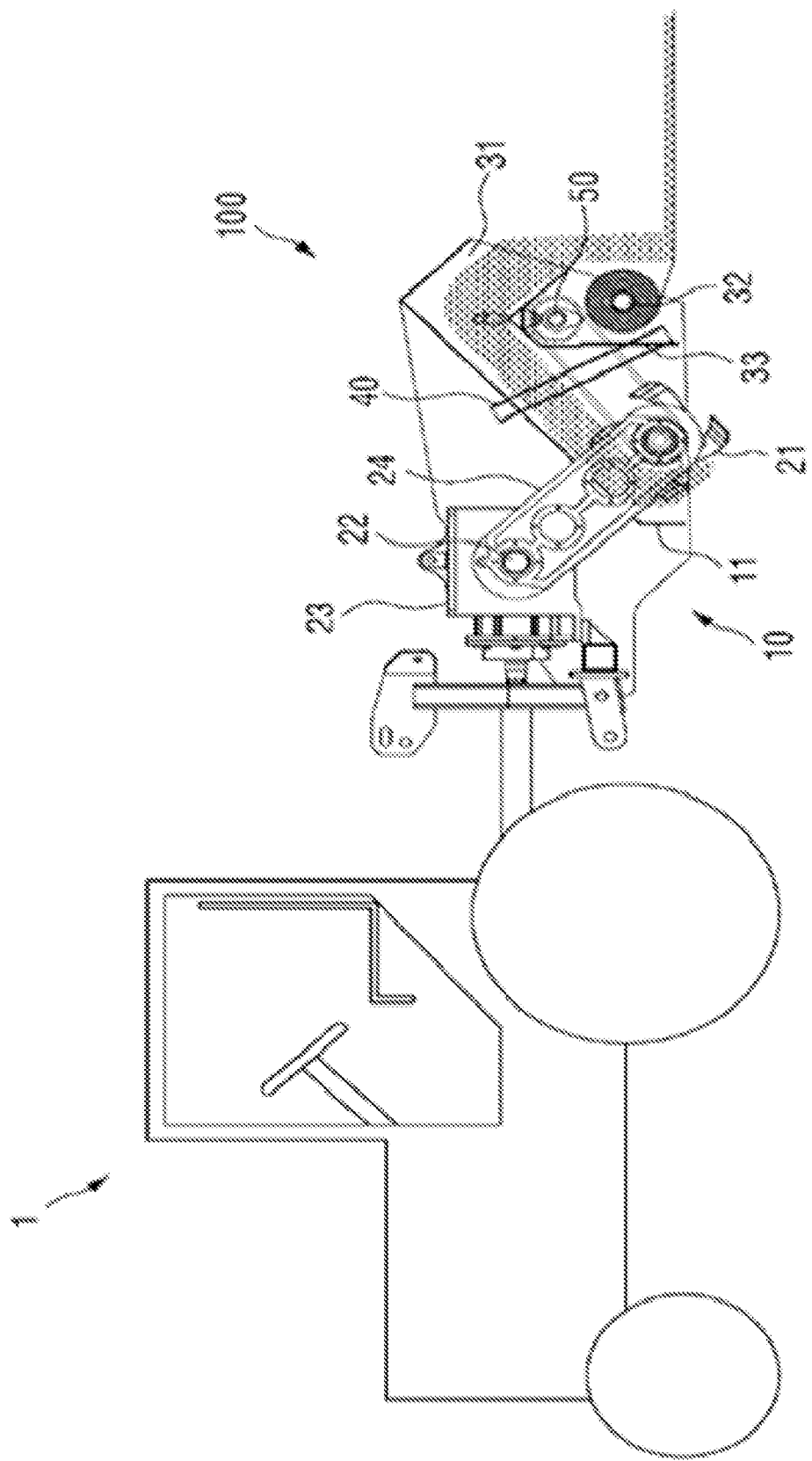
FIG. 6 is a side configuration view of a covering soil mulching apparatus having a function of preventing clogging of soil according to an embodiment of the present disclosure.

First, FIG. 6 illustrates a side configuration view of the covering soil mulching apparatus having a function of preventing clogging of soil according to the embodiment of the present disclosure.

As illustrated in FIG. 6, a covering soil mulching apparatus 100 having a function of preventing clogging of soil according to the embodiment of the present disclosure is installed at the rear end of an agricultural machine 1 such as a riding type covering machine, a rice transplanter, a tractor, a cultivator, or a managing machine.

The covering soil mulching apparatus 100 having a function of preventing clogging of soil according to the embodiment of the present disclosure as a whole is configured to include a soil scattering part 10, a mulching film laying part 30, a soil oscillating part 50, and a supply pipe 40.

The soil scattering part 10 according to the embodiment of the present disclosure is provided at the rear end of the agricultural machine 1, and is configured to include a scattering part frame 11, and a scattering unit 20 which is provided on the lower end side of the scattering part frame 11 and scatters soil of the paddy field.

Figure 7:
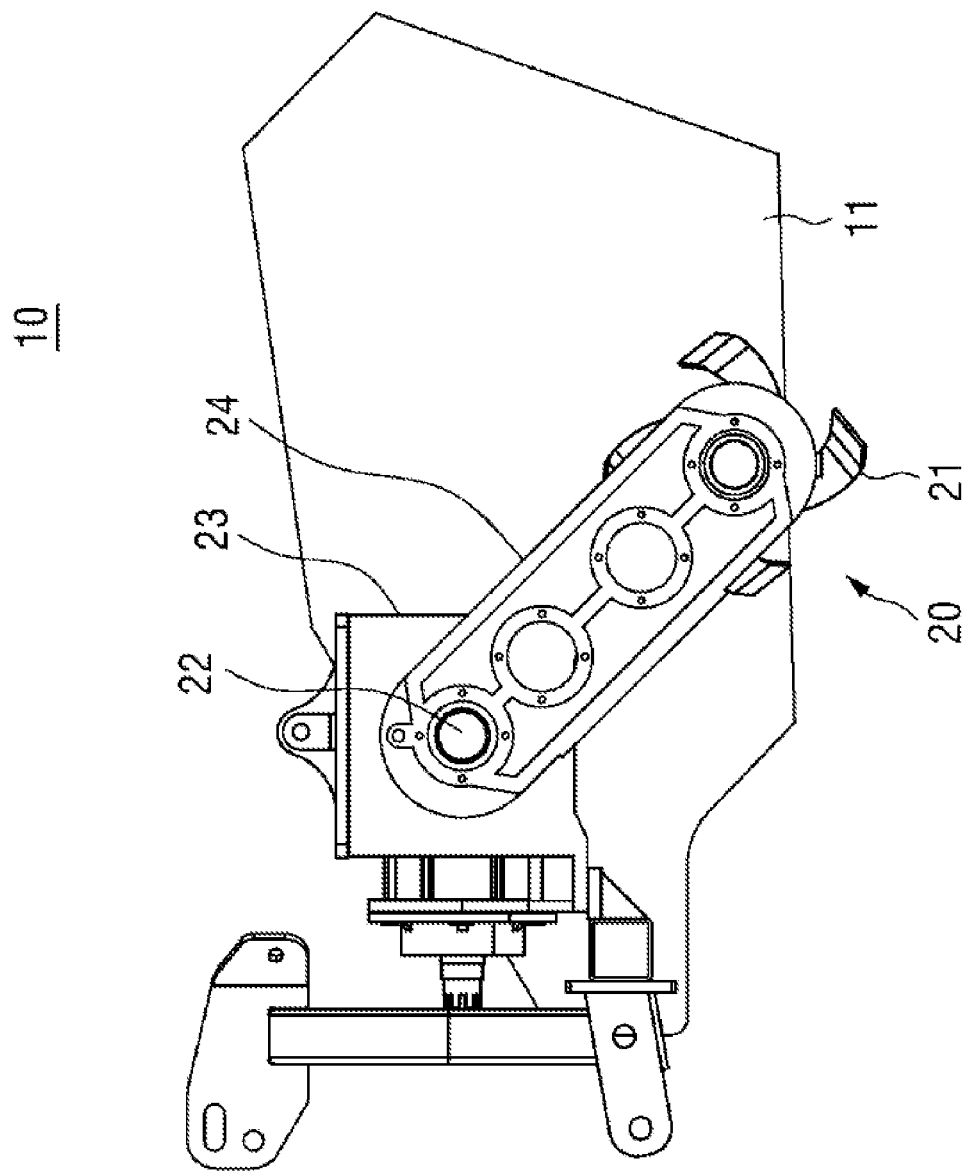
FIG. 7 is a side configuration view of a soil scattering part side according to the embodiment of the present disclosure.

FIG. 7 illustrates a side configuration view of a soil scattering part side according to the embodiment of the present disclosure. As illustrated in FIG. 7, it can be seen that the scattering unit 20 according to the embodiment of the present disclosure includes a scattering blade 21 which scatters soil, a gearbox 23 having a first driving part 22, and a first power transmission member 24 which transmits the driving force of the first driving part 22 to the scattering blade 21.

That is, the soil scattering part 10 is configured to include a three-point link and the scattering part frame 11 connected to the rear end of the agricultural machine 1, the gearbox 23 receiving PTO power, the scattering blade 21, and the first power transmission member 24 which connects the gearbox 23 and the scattering blade 21.

The first power transmission member 24 connecting the gearbox 23 and the scattering blade 21 is installed inclined rather than vertical, and the inclination angle is preferably about 20 to 60 degrees.

The mulching film laying part 30 according to the embodiment of the present disclosure is configured to include a laying part frame 31 connected to the rear end side of the soil scattering part 10, and a mulching film holding part 32 which has a mulching film 2 wound therearound and spreads the mulching film 2 on the paddy field.

Figure 8:
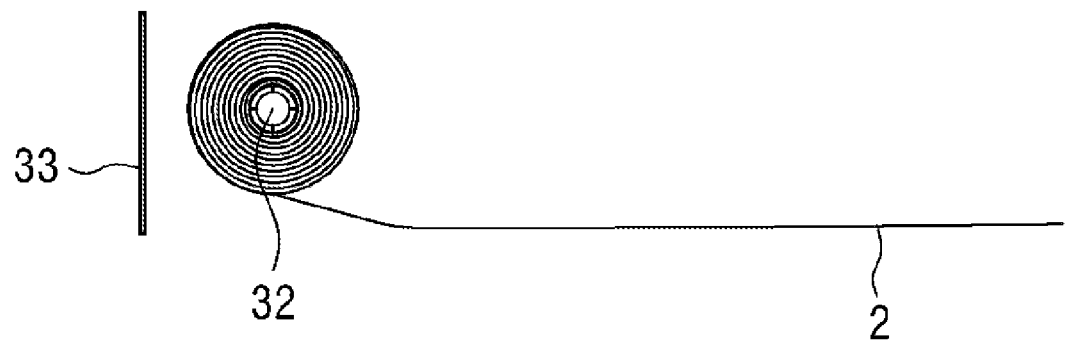
FIG. 8 is a side configuration view of a rear protective cover of a mulching film laying part and a mulching film holding part according to the embodiment of the present disclosure.

FIG. 8 illustrates a side configuration view of a rear protective cover of the mulching film laying part and the mulching film holding part according to the embodiment of the present disclosure.

As illustrated in FIG. 8, the mulching film 2 is wound around the mulching film holding part 32, the wound mulching film 2 is spread on the paddy field as the mulching film holding part 32 is rotated, and soil scattered by the soil scattering part 10 is applied. In addition, a film protective rear cover 33 may be installed in front of the mulching film holding part 32.

In addition, as illustrated in FIG. 6, it can be seen that at least one supply pipe 40 is installed in the covering soil mulching apparatus 100 according to the embodiment of the present disclosure.

Through the supply pipe 40, at least one of water, seeds, fertilizers, pesticides, and drop hoses can be supplied to the lower portion of the mulching film 2.

The soil oscillating part 50 according to the embodiment of the present disclosure is configured to include an oscillating plate 60 which is located above the mulching film holding part 32 and guides the soil scattered by the soil scattering part 10 to be transported to the rear side and laid on the upper surface of the mulching film 2, an oscillator for oscillating the oscillating plate 60 to prevent the formation of a soil wall on the oscillating plate 60, and an oscillating power transmission part 80 for transmitting power to the oscillator 70.

Figure 9:
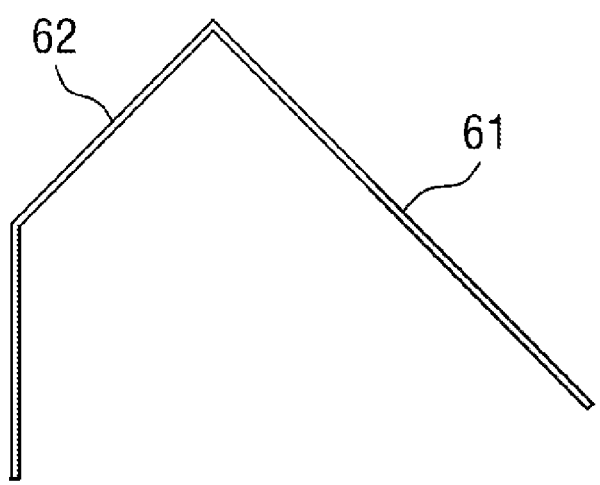
FIG. 9 is a side view of an oscillating plate according to the embodiment of the present disclosure.
Figure 10:
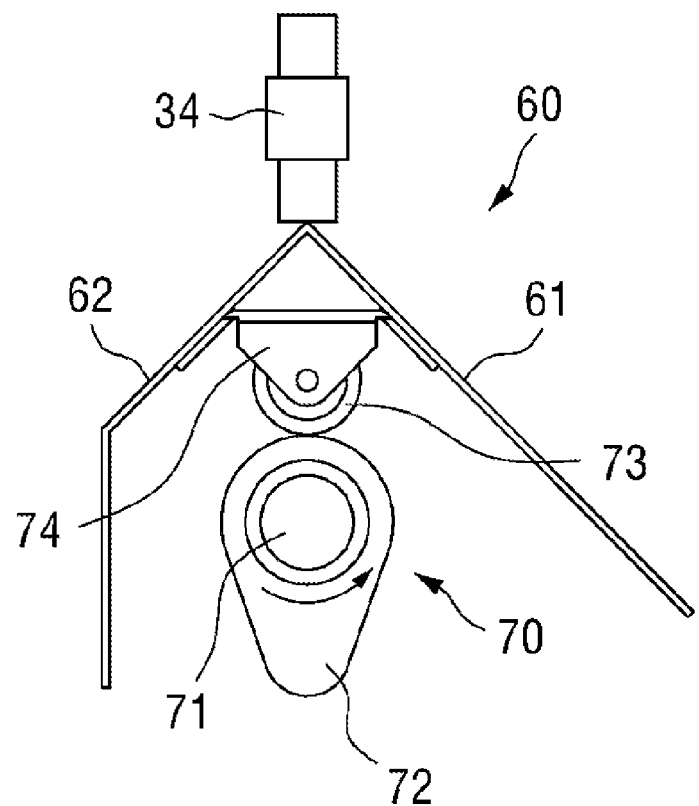
FIG. 10 is a side configuration view of a soil oscillating part according to the embodiment of the present disclosure.
Figure 11:
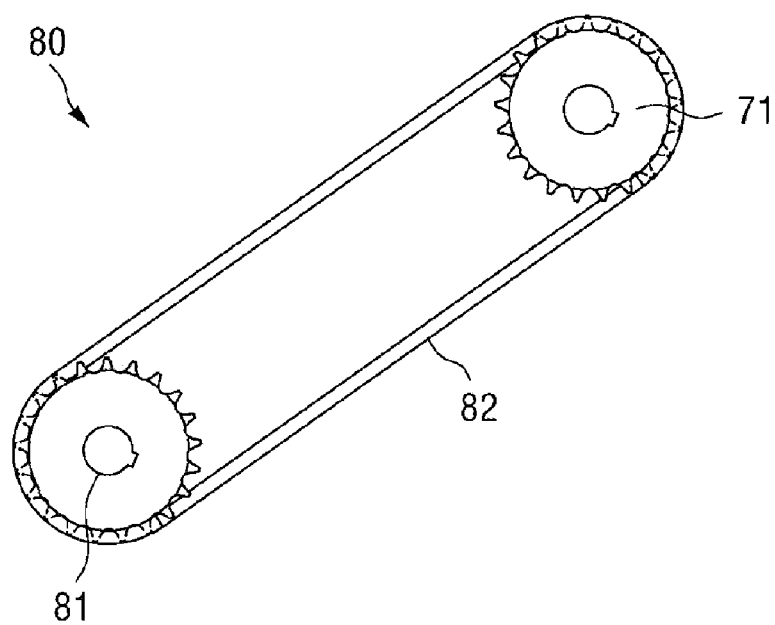
FIG. 11 is a side configuration view of an oscillator according to the embodiment of the present disclosure.
Figure 12:
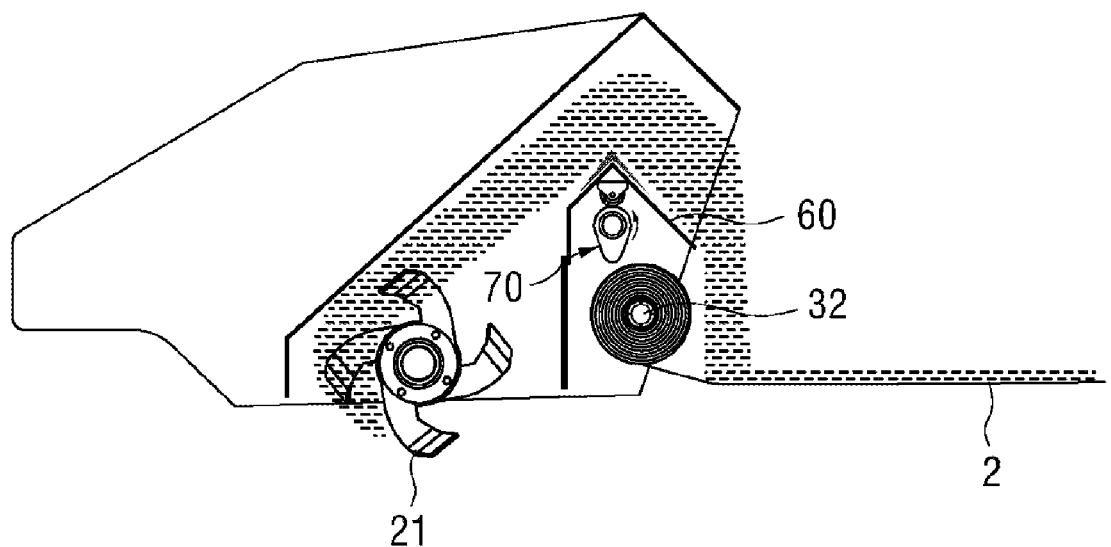
FIGS. 12 to 15 schematically illustrate an operation method of preventing clogging of soil by the covering soil mulching apparatus having a function of preventing clogging of soil according to the embodiment of the present disclosure.
Figure 13:
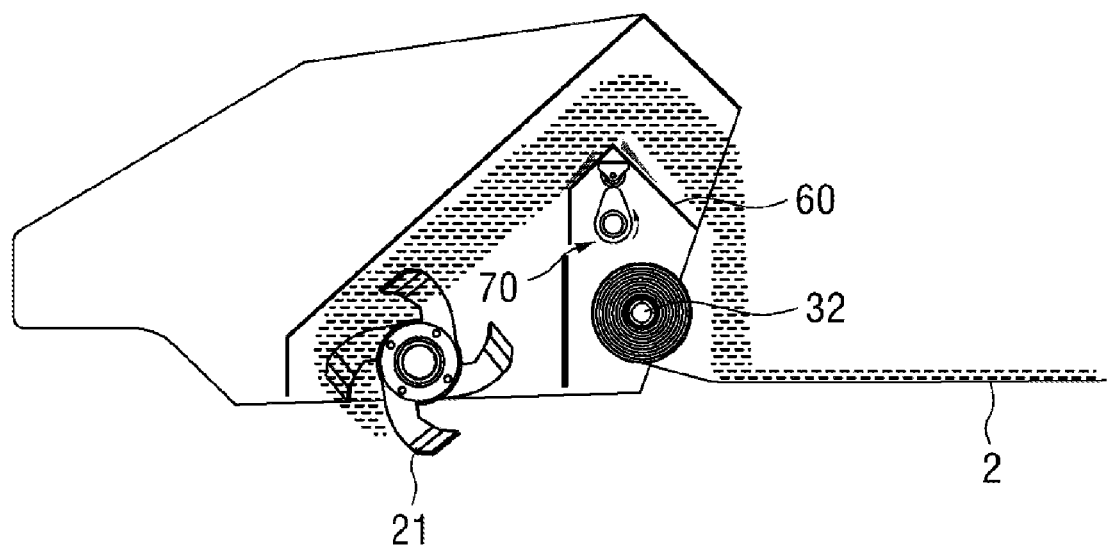
Figure 14:
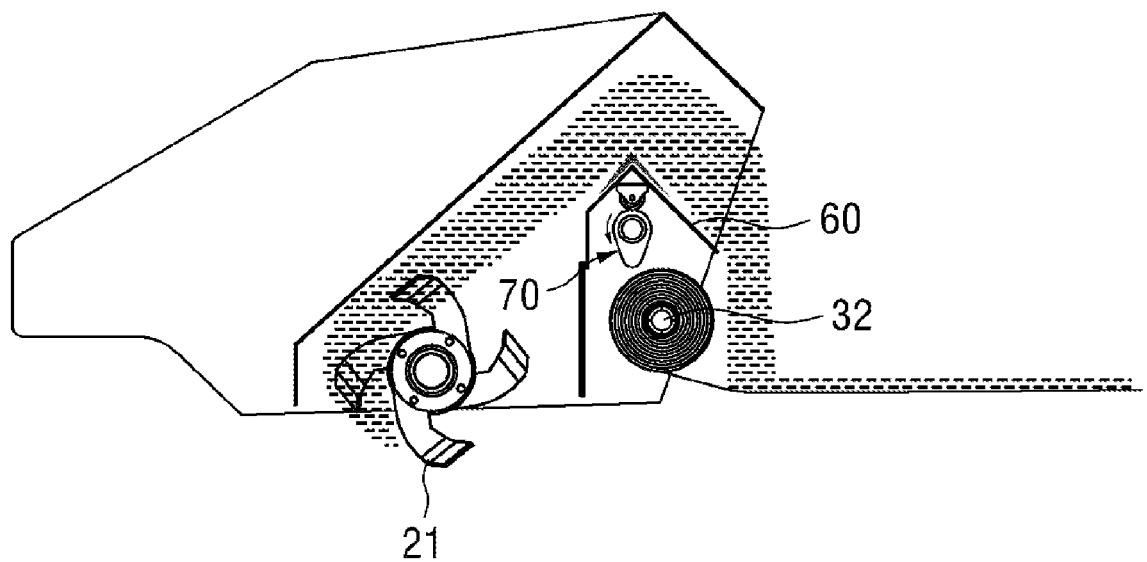
Figure 15:
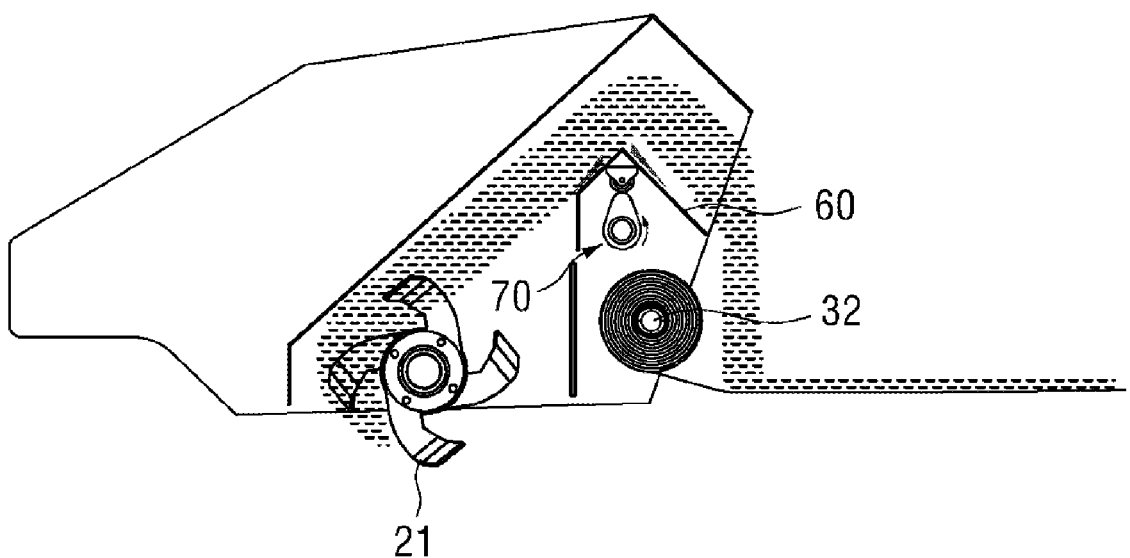

FIG. 9 illustrates a side view of the oscillating plate according to the embodiment of the present disclosure. FIG. 10 illustrates a side configuration view of the soil oscillating part according to the embodiment of the present disclosure. FIG. 11 illustrates a side configuration view of the oscillator according to the embodiment of the present disclosure.

As illustrated in FIG. 9, it can be seen that the oscillating plate 60 according to the embodiment of the present disclosure has a shape pointed upward with respect to the side, and is configured to include a rearward inclined plate 61 inclined toward the rear side with respect to the pointed portion, and a forward inclined plate 62 inclined toward the front side. Therefore, the scattered soil flows from the rearward inclined plate 61 and covers the spread mulching film 2.

In addition, according to the embodiment of the present disclosure, by vibrating, shaking, and oscillating the oscillating plate 60 by the soil oscillating part 50, the problem in the related art that a soil wall is formed and soil covering is stopped can be solved.

As illustrated in FIGS. 6 and 10, it can be seen that the oscillator 70 according to the embodiment of the present disclosure includes an oscillating shaft 71 rotated by the oscillating power transmission part 80, and a cam member 72 installed on the oscillating shaft 71. The shape of the cam member 72 can be in various forms such as a positive motion cam, a spherical cam, and a conical cam, and the specific shape is not limited as long as the diameter is changed with respect to the rotation center axis.

In addition, a roller 73 hinged to a bracket 74 joined to the lower end surface of the oscillating plate 60 is included, and the outer surface of the cam member 72 is rotated in contact with the outer surface of the roller 73.

Therefore, the outer surface of the roller 73 comes in contact with the outer surface of the cam member 72, and the oscillating plate 60 is oscillated according to the shape of the outer surface of the cam member 72 by the rotation of the cam member 72, thereby preventing a soil clogging phenomenon.

In addition, as illustrated in FIGS. 6 and 11, it can be seen that the oscillating power transmission part 80 is configured to include a driving shaft 81 which is driven to rotate by a second driving part, and a second power transmission member 82 which transmits the power of the driving shaft 81 to the oscillating shaft 71.

As illustrated in FIGS. 6 and 10, it can be seen that the oscillator 70 is configured to include a reciprocating motion guide 34 joined to a laying part frame 31, and a reciprocating motion shaft 63 which is joined to one upper end side of the oscillating plate 60 and guides a reciprocating motion of the oscillating plate 60 by the reciprocating motion guide 34.

Therefore, in the reciprocating motion guide 34 joined to the laying part frame 31, the reciprocating motion shaft 63 joined to the oscillating plate 60 is moved, so that the oscillating plate 60 does not deviate from a set reciprocating path and can oscillate.

FIGS. 12 to 15 schematically illustrate an operation method of preventing clogging of soil by the covering soil mulching apparatus having a function of preventing clogging of soil according to the embodiment of the present disclosure.

As illustrated in FIGS. 12 to 15, it can be seen that according to the operation of the covering soil mulching apparatus 100 having a function of preventing clogging of soil according to the embodiment of the present disclosure, the oscillating plate 60 is driven to continuously oscillate vertically as the cam member 72 of the oscillator 70 rotates, whereby a soil clogging phenomenon on the oscillating plate 60 can be prevented.

What is claimed is:

1. A covering soil mulching apparatus having a function of preventing clogging of soil, in which the covering soil mulching apparatus is installed at a rear end of an agricultural machine, the covering soil mulching apparatus comprising:
    a soil scattering part that is provided at the rear end of the agricultural machine and includes a scattering part frame and a scattering unit which is provided on a lower end side of the scattering part frame and scatters soil on a floor;
    a mulching film laying part that includes a laying part frame connected to a rear end side of the soil scattering part, and a mulching film holding part which has a mulching film wound therearound and spreads the mulching film on the floor;
    an oscillating plate that is located above the mulching film holding part and guides the soil scattered by the soil scattering part to be transported to a rear side and laid on an upper surface of the mulching film; and
    a soil oscillating part that includes an oscillator for oscillating the oscillating plate to prevent formation of a soil wall on the oscillating plate.

2. The covering soil mulching apparatus of claim 1, further comprising:
    at least one supply pipe for supplying at least one of water, a seed, a fertilizer, a pesticide, and a drop hose to a lower portion of the mulching film.

3. The covering soil mulching apparatus of claim 1, wherein the scattering unit includes a scattering blade which scatters soil, a gearbox having a first driving part, and a first power transmission member which transmits a driving force of the first driving part to the scattering blade.

4. The covering soil mulching apparatus of claim 1, wherein the oscillator includes an oscillating shaft rotated by an oscillating power transmission part, and a cam member installed on the oscillating shaft; and
    a lower end surface of the oscillating plate comes in contact with an outer surface of the cam member, and the oscillating plate is oscillated according to a shape of the outer surface of the cam member by rotation of the cam member.

5. The covering soil mulching apparatus of claim 4, wherein the oscillator further includes a roller hinged to a bracket joined to the lower end surface of the oscillating plate, and the outer surface of the cam member is rotated in contact with an outer surface of the roller; and
    the oscillator further includes a reciprocating motion guide joined to the laying part frame, and a reciprocating motion shaft which is joined to one upper end side of the oscillating plate and guides a reciprocating motion of the oscillating plate by the reciprocating motion guide.

6. The covering soil mulching apparatus of claim 5, wherein the oscillating power transmission part includes a driving shaft which is driven to rotate by a second driving part, and a second power transmission member which transmits a power of the driving shaft to the oscillating shaft.

7. The covering soil mulching apparatus of claim 1, wherein the agricultural machine is at least one selected from the group consisting of a riding type covering machine, a rice transplanter, a tractor, a cultivator, and a managing machine.

* * * * *